(No Model.)
C. C. HINES & J. A. WILLARD.
APPARATUS FOR REPAIRING PNEUMATIC TIRES.
No. 575,889.   Patented Jan. 26, 1897.
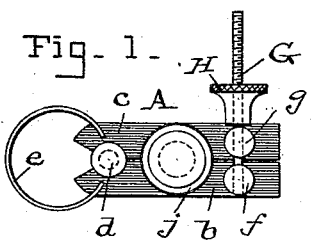
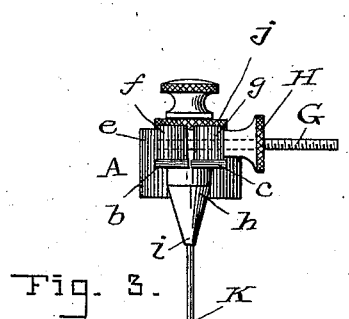
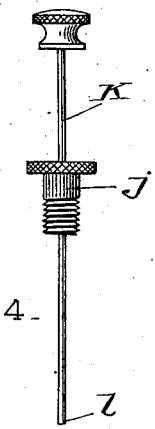
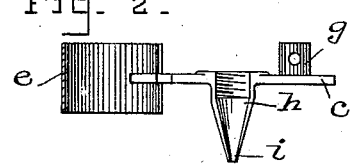
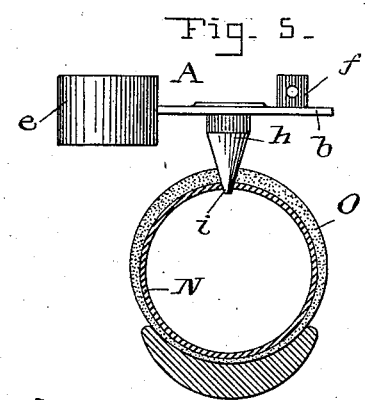
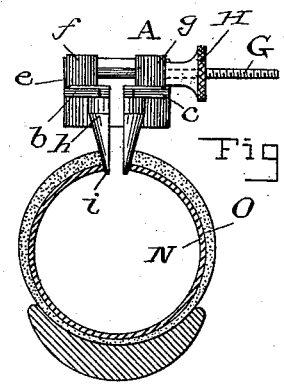
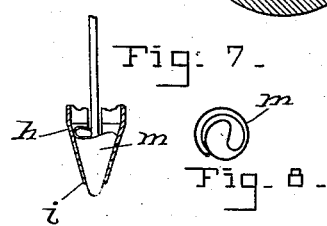
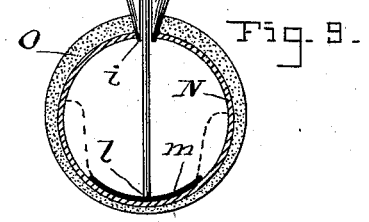
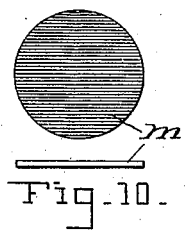
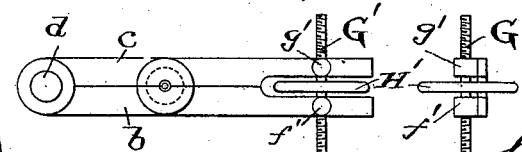
WITNESSES :—
Lee J. Van Horn.
Douglas Bell
INVENTORS :—
Calvert C. Hines.
James A. Willard

UNITED STATES PATENT OFFICE

CALVERT C. HINES AND JAMES A. WILLARD, OF BALTIMORE, MARYLAND, ASSIGNORS TO THE NEW YORK BICYCLE EQUIPMENT COMPANY, OF NEW YORK, N. Y.

APPARATUS FOR REPAIRING PNEUMATIC TIRES.

SPECIFICATION forming part of Letters Patent No. 575,889, dated January 26, 1897.

Application filed February 12, 1896. Serial No. 579,192. (No model.)

*To all whom it may concern:*

Be it known that we, CALVERT C. HINES and JAMES A. WILLARD, citizens of the United States, residing at Baltimore, in the State of Maryland, have invented certain new and useful Improvements in Apparatus for Repairing Pneumatic Tires, of which the following is a specification.

This invention relates to apparatus for repairing pneumatic tires, and has special reference to that class of tires generally termed "double-tube" and comprising an inner inflatable air-tube and an outer protector casing or tread therefor.

The object of the invention is to provide apparatus by which a puncture in a tire of this character may be quickly and conveniently sealed to prevent the escape of air and without the necessity of removing the outer casing or tread.

Heretofore special plugs, consisting of a stem or shank having at one end an enlarged head and instrumentalities for inserting the same through the puncture, have been extensively employed for repairing tires of the single-tube or "hose-pipe" type; but these plugs, for reasons well known in the art, are not adapted for use in repairing punctures in the inflatable air-tube of a double-tube tire. In order, therefore, for repairing double-tube tires from the exterior and without removing the outer covering or tread, we have illustrated in the accompanying drawings an apparatus whereby patches of thin sheet-rubber or analogous material, without a stem or shank, may be inserted through the puncture in the tire and then cemented, so as to seal said puncture.

Figure 1 is a top or plan view of a tool or instrument for carrying out our method. Fig. 2 is a view of one of the side bars and nozzle-halves disconnected, showing the spring in section. Fig. 3 is an end view of the tool, looking toward the screw-stem. Fig. 4 is a view of the plunger-rod and the screw-cap thereon. Fig. 5 shows a section view of a double-tube tire and a side view of the tool as preliminarily inserted therein. Fig. 6 also shows a section view of the tire and an end view of the tool with its nozzle expanded for passage of the patch. Fig. 7 shows a section view of the nozzle expanded and the patch folded therein as it appears when being forced through the nozzle. Fig. 8 is a view looking down upon the patch when folded as shown in Fig. 7. Fig. 9 is a plan view of the folded patch held within the tire preliminarily to cementing. Fig. 10 shows a plan and an edge view of the patch. Fig. 11 shows a plan and an edge view, respectively, of a modified form of tool.

Referring to the drawings, the letter A designates one form of tool or instrument for carrying out our method. This tool has two side bars $b$ $c$, connected at one end by a hinge or pivot $d$. A curved spring $e$, rigidly secured in rear of the pivot to said side bars, serves normally to separate or spread apart the bars. At the end opposite the pivot the side bars are provided with posts $f$ $g$ and a screw-stem G, one end of which is rigidly attached to the post $f$, while the other end passes loosely through the other post $g$. By means of a thumb-nut H on the threaded stem the two side bars may be drawn together and held against the tension of the said spring $e$. On each side bar $b$ $c$ is a pendent cup-half $h$, said halves when brought together forming a cup having an open nozzle with a pointed end $i$. The cup is screw-threaded interiorly to receive a threaded cap $j$, by means of which cement may be injected from the cup through the nozzle into the tire, and a plunger-rod K, having a blunt end $l$, moves loosely through the cap and is of length sufficient to have its said blunt end project far enough below the nozzle end $i$ to hold a patch $m$ against the side of the tire opposite the puncture when the instrument is inserted into said puncture, as will now be described.

In applying a patch the nozzle end $i$ of the tool is first inserted into the puncture of the tire after the latter has been preliminarily inflated. The thumb-nut H is then turned to permit the spring $e$ to expand and force apart the nozzle-halves $h$, this action causing the inner and outer tubes N O, respectively, of the tire to slightly expand. The plunger-rod K is now removed from the tool and the thin sheet-rubber patch m folded around it in cone form, as shown in Figs. 7 and 8. This done, the tool and patch are inserted within the cup-nozzle and the tire deflated, and the patch is forced through the nozzle and puncture by means of the plunger-rod and held by said rod against the rim side of the tire opposite the puncture, the elasticity of said patch causing it to spread out, as shown in Fig. 9. While the patch is still held in this position, the thumb-nut H is screwed up to close the two nozzle-halves together and the cup-nozzle is filled with cement. The screw-cap $j$ is now screwed into the cup-nozzle so as to force the cement through the nozzle, so that it will trickle down the plunger-rod, and finally the punctured side of the tire is pressed down against the patch, as shown by dotted lines in Fig. 9, thereby forcing the cement into contact with the patch. A slight pressure of the fingers on the tire will spread the cement and cause the patch to adhere to the interior side of the inner tube and seal the puncture. The tool is forced out when the tire is pressed down.

In Fig. 10 the construction of the tool is modified by dispensing with the spring $e$. In this instance also the screw-stem G' extends through both posts $f'$ $g'$ and the thumb-nut H' is between the two side bars of the tool. The operation with this construction will be readily understood.

It will be seen that we have provided a method and an apparatus whereby a patch of thin sheet-rubber may be cemented to the interior side of the inner tube from the exterior to close the puncture without rendering it necessary to remove the outer tube. The advantage resulting will be obvious.

The patch $m$ may be of sheet-rubber alone or may have one face thereof covered with cloth or other material.

Having thus described our invention, what we claim is—

1. In a tool for repairing pneumatic tires, the combination with an interiorly-threaded cup provided with expansible nozzle-halves and means for contracting and expanding said nozzle-halves, of a plunger of relatively greater length than the cup and provided with a screw-cap to force cement through the nozzle.

2. In a tool for repairing pneumatic tires, the combination of two side bars carrying intermediate of their length a pendent expansible nozzle, a spring connected to said bars at one end and adapted to expand the bars and nozzle, a screw-stem at the opposite end of the bars to contract said bars and nozzle, and a plunger, substantially as and for the purpose described.

3. In a tool for repairing pneumatic tires, the combination of two side bars carrying intermediate of their length a pendent expansible interiorly-threaded cup-nozzle, a spring connected to said bars at one end and adapted to expand the bars and nozzle, a screw-stem at the opposite end of the bars to contract said bars and nozzle, and a plunger provided with a screw-cap to force cement through the nozzle.

4. In a tool for repairing pneumatic tires, the combination of two side bars carrying intermediate of their length a pendent expansible nozzle, a spring at one end thereof to expand the bars and nozzle, a screw-stem at the opposite end to contract the bars and nozzle, and a plunger of relatively greater length than said nozzle, and coacting therewith in the manner and for the purpose herein shown and described.

In testimony whereof we affix our signatures in the presence of two witnesses.

CALVERT C. HINES.
JAMES A. WILLARD.

Witnesses:
H. JOSEPH DOYLE,
RAMSEY B. WILLIAMS.